Figure 3:
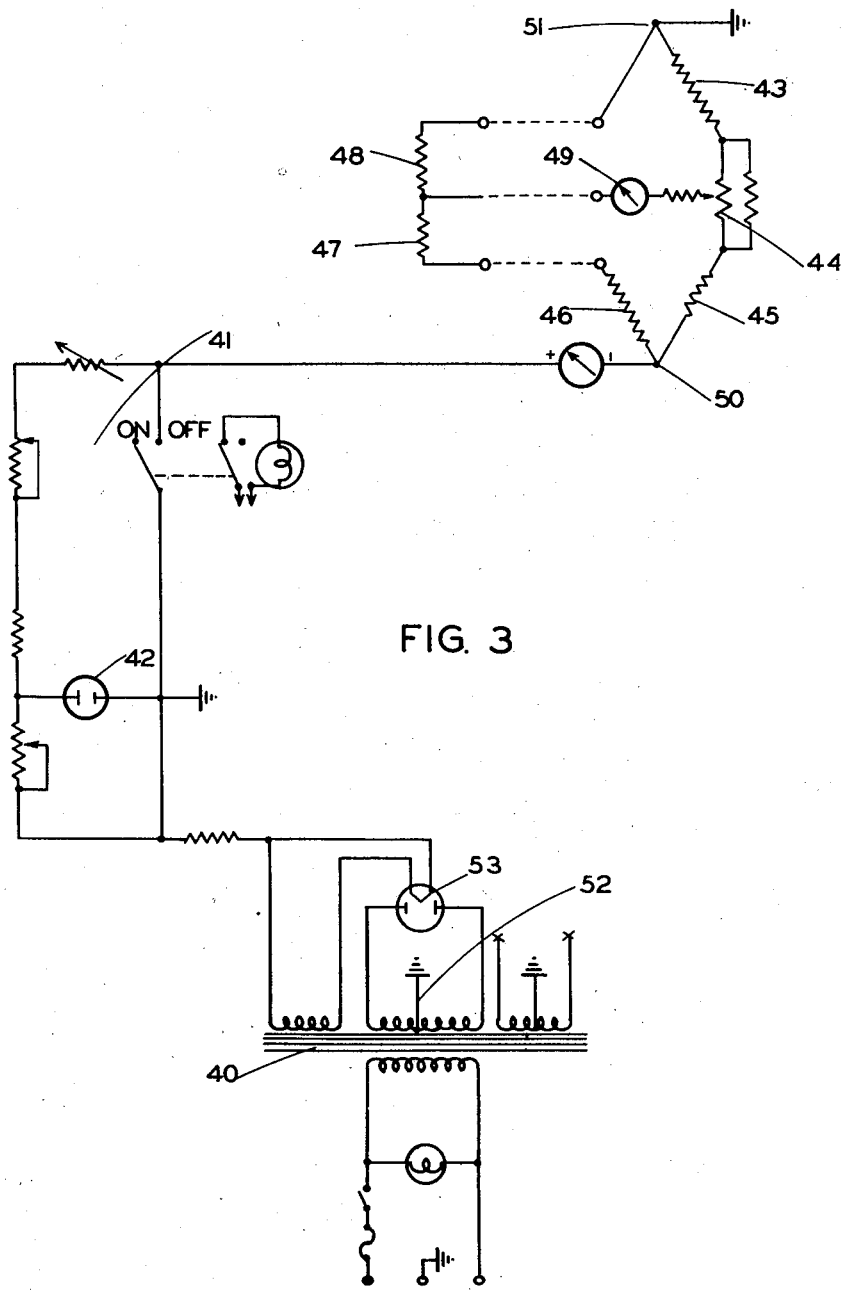

Oct. 30, 1951     A. O. C. NIER     2,573,649
GAS ANALYZER
Filed Sept. 30, 1947     2 SHEETS—SHEET 1
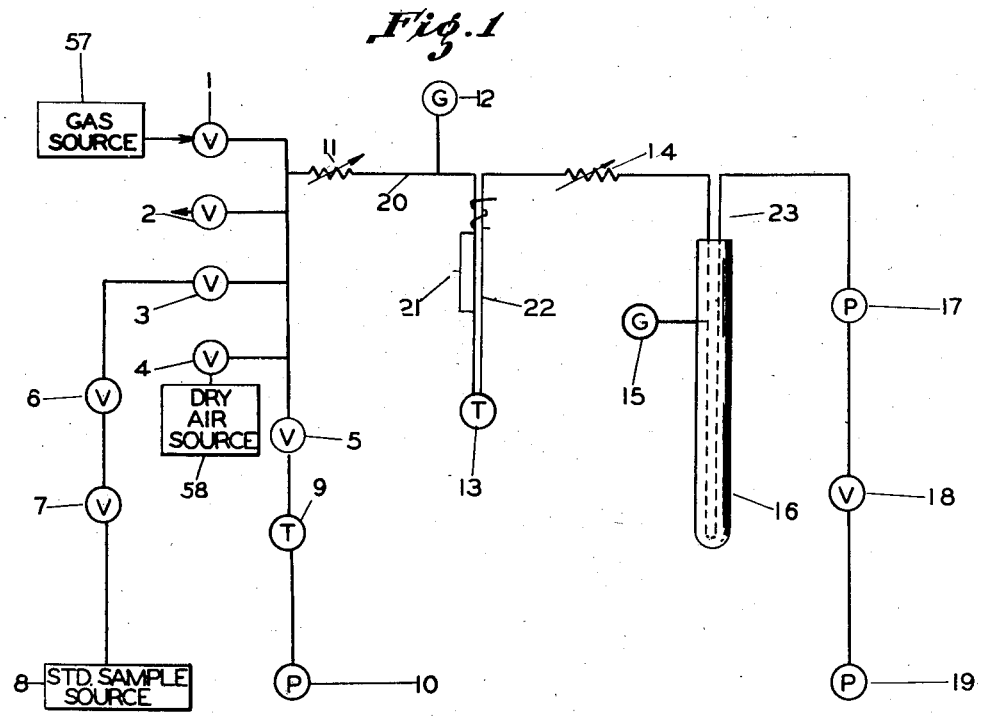
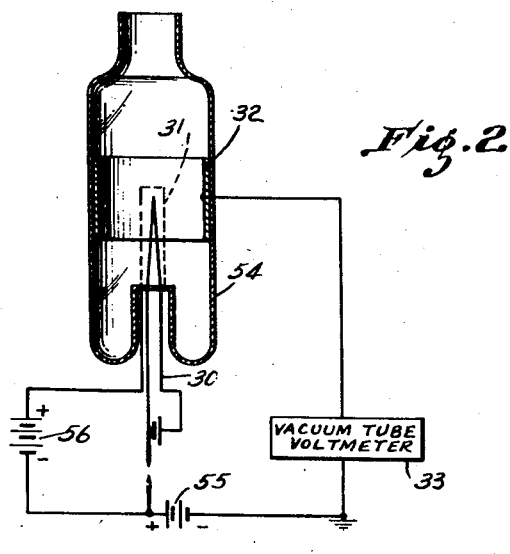
*INVENTOR.*
ALFRED O.C. NIER
BY Oct. 30, 1951  A. O. C. NIER  2,573,649
GAS ANALYZER Filed Sept. 30, 1947  2 SHEETS—SHEET 2

INVENTOR.
ALFRED O.C. NIER
BY
Robert A. Loomis
Attorney

Patented Oct. 30, 1951

2,573,649

UNITED STATES PATENT OFFICE 2,573,649

GAS ANALYZER

Alfred O. C. Nier, Minneapolis, Minn., assignor to the United States of America as represented by the United States Atomic Energy Commission Application September 30, 1947, Serial No. 776,953

4 Claims. (Cl. 73—23)

My invention relates to gas analyzers and more particularly to a method of and a system for continuously sampling a binary gaseous mixture to determine the extent of its contamination.

In the prior art of testing gases, it has generally been the practice to extract samples of the gases periodically and subject them to analysis by a mass spectrometer or the like. Where the composition of the gases varies over a considerable range, this average result is not entirely satisfactory. Instantaneous or continuous readings then offer the only reliable information under such circumstances. However, continuous bleeding of the system for analysis purposes may result in loss or disposal of appreciable quantities of the gases which may not be practicable from an operational standpoint.

Applicant with a knowledge of all of these problems in the prior art has for an object of his invention the provision of a system for continuously bleeding small quantities of gases to be tested from a system and analyzing them.

Applicant has as another object of his invention the provision of a system for continuously extracting small quantities of gases to be tested and measuring the relative quantities of contaminating gases by bringing them in contact with and/or exposing them to the action of an ion gauge.

Applicant has as another object of his invention the provision of a system for the continuous passage of gases with a constriction for cooperation with a pressure gauge to set up constant conditions to permit substantially linear operation of a further pressure sensitive device for indicating quantities of contamination gases passing through the system.

Applicant has as a further object of his invention the provision of an apparatus for continuously analyzing a mixture of gases and for continuously determining the composition of a binary gaseous mixture having a condensable component.

Applicant has as a still further object of his invention the provision of a system for contiunously measuring the composition of a binary gaseous mixture under changing conditions of flow and composition.

Other objects and advantages of my invention will appear from the following specification and accompanying drawings and the novel features thereof will be particularly pointed out in the annexed claims.

In the drawings, Fig. 1 is a schematic of one form of my improved system for the continuous analysis of gases. Fig. 2 is a diagrammatic showing of the ion gauge and the circuits employed to control its operation in my improved system. Fig. 3 is a diagrammatic showing of a Pirani gauge circuit used in my improved system.

In general, the present method and apparatus are adapted for use in analyzing a gaseous mixture as follows: (1) By introducing a flow of gas to be analyzed from a relatively high pressure area into a very low pressure area; (2) regulating this flow to introduce a predetermined quantity and/or composition of gas, since the composition of the gas introduced is not necessarily constant, and the flow would vary; (3) thereafter condensing or reacting one or more components of the gaseous mixture in order to remove such components from the gaseous phase; (4) measuring the pressure of the components remaining in the gaseous phase; (5) and calibrating the apparatus and regulating the resistance in the gas lines so that the relationship of the pressure reading and the percentage of the non-condensed gas is made linear.

The particular apparatus illustrated in the flow diagram of Fig. 1 was devised for measuring the concentration of nitrogen or air which may occur as impurities in systems containing uranium hexafluoride. However, other gaseous mixtures could be analyzed by adapting the apparatus for use with them.

Gas system

Referring to Fig. 1, the binary gas may be introduced at the gas inlet from source 57 and circulated so as to be withdrawn at the gas return by suitable adjustment of the valves 1 and 2. Arrows indicate the direction of flow of gas from the inlet to the return. The valves 3, 4, and 5 are closed during this process but are utilized for calibration of the device in the manner explained hereinafter. The gas is metered into the line 20 by means of an adjustable capillary leak 11. This adjustable leak is a device for introducing a very small quantity of a gas from a relatively high pressure area into a very low pressure area without fractionating the gas, and thereby avoids introducing a change in the composition of the gas resulting from its transfer to the low pressure area. A satisfactory device for this purpose is rather difficult to devise, and the one used in the present arrangement is the adjustable leak employed for a mass spectrometer. See copending application of Nier et al., Ser. No. 621,849. Another suitable leak is described in application of Nier et al., Ser. No. 543,699, now Patent No. 2,422,921.

The Pirani gauge generally designated 12 could be employed as a flow meter by measuring the drop in pressure between two points in the line. However, in the present instance it was employed to establish a constant flow and/or uniform content of entering gas. Thus an absolute calibration of flow in cc./min. or some other absolute unit was not necessary although the device could be so calibrated. Any suitable Pirani gauge may be employed in the present apparatus although the one for which the wiring diagram is shown in Fig. 3 was particularly satisfactory.

This gauge measures pressure indirectly, and the operation of this hot wire gauge is based on the principle that the heat conductively of a gas at low pressure, e. g. below 1000 microns, is approximately proportional to its pressure. The gauge measures the resistance of a length of wire. The wire is inclosed in a tube attached to the vacuum system so that the wire is exposed to the same vacuum as in the system. The wire is heated by an electric current flowing through it. Within a certain range, the temperature of the wire, and thus its resistance, depends upon the pressure of the gases surrounding the wire. When the pressure is decreased, relatively less heat escapes from the wire, its temperature rises with consequent increase in resistance, and the meter reads fewer microns of pressure.

In order to remove the condensable component in the mixture of process gas and air or nitrogen, the mixture is passed through the mercury trap 13. This device comprises a pool of mercury having, of course, mercury vapors over it in the lines 20, 21, and 22. In the passage of the mixture through the mercury trap the uranium hexafluoride vapors react with the mercury vapors and the uranium hexafluoride is removed from the gaseous state. The reaction probably involves a reduction of $UF_6$ to $UF_4$ with the formation of $HgF_2$. Both of these latter substances are solids under the conditions present in the system. Nitrogen or air, as the case may be, continues through the line constriction 14 to the line 23, through liquid air trap 16, and finally is removed through the pumping system including a diffusion pump 17, valve 18, and mechanical pump 19. The liquid air trap 16 serves to solidify and remove any residue of uranium hexafluoride from the mixture. Any conventional trap such as a bent tube passing through a bath of liquid oxygen will serve the purpose. The ion gauge 15 was employed to measure the pressure of the nitrogen or air. This type of pressure gauge was used instead of the Pirani tube, since it operates successfully over the range of pressures encountered in this portion of the system, while the Pirani tube is not suitable for use at these lower pressures. An ion gauge is a device for accurately measuring very low pressures, and the one employed for this purpose was especially developed for use with the mass spectrometer. However, for convenience a wiring diagram of the ion gauge and its controlling elements are shown diagrammatically in Fig. 2.

The elements shown in the flow sheet of Fig. 1, and not discussed in detail above, such as the piping, valves, pumps, etc., are conventional. However, the actual pumping system employed in the present apparatus was an oil diffusion pump model VMF-10 manufactured by Distillation Products Company, Rochester, New York. It was backed by a fore pump capable of producing a pressure of approximately 100 microns of mercury, which in the present instance was provided by a Welch "Duoseal" pump model 1400B.

Operation of gas analyzing system

It is fundamental that a selected Pirani gauge reading will not indicate the same gas flow for different gas mixtures, since the reading of the Pirani guage is not only a function of pressure but may also vary for different mixtures of gases. In brief, the Pirani gauge reading is determined by two variables, that is, pressure and content of the gas mixture. Furthermore, the Pirani gauge readings are not linear but increase sharply as the percentage of air or nitrogen increases in a mixture of uranium hexafluoride and air or nitrogen.

The fact that changes in proportion or content of the mixture will effect the operation of the Pirani gauge results from the fact that this gauge is made one leg of a Wheatstone bridge. Current passing through the gauge or resistance raises its temperature. As the pressure to which it is exposed increases, the molecules of the gas make more frequent contact with the resistance and absorb and dissipate its energy, causing the temperature thereof to fall. Likewise, a change in the proportions of a gas mixture alters the energy absorbing characteristics of the molecules striking the resistance. Both factors contribute to the operation of the Pirani gauge and to the balance of the bridge dependent thereon. It is not, therefore, possible to employ the Pirani gauge as a device for accurately measuring pressure changes when the gas mixtures are also changing.

In order to make a selected specific Pirani gauge reading serve as an index for determining the rate of flow of various mixtures of uranium hexafluoride and nitrogen or air, or for other mixtures, a constriction or pinch 14 is introduced in the gas line. In the device illustrated in Fig. 1 this constriction consists of a pinched section of tubing although suitable capillaries or other means of increasing resistance in the line could be used. The effect of this is to increase the pressure in that portion of the system located ahead of the pinch or constriction 14, while not appreciably affecting the pressure in that part of the system behind the constriction. In this way conditions in that portion of the system measured by the Pirani gauge may be altered more than those in that portion measured by the ion gauge 15. Such an arrangement, therefore, may be employed to alter the relation of the readings of the Pirani gauge as flow changes and different gas mixtures are passed through the system.

Once a system is calibrated, as described more fully hereinafter, operation of the system for determinations of flow of nitrogen or air contamination is dependent upon the adjustment of the leak 11 to the point where the Pirani gauge indicates a predetermined reading corresponding to a fixed setting of constriction 14. This reading of the Pirani gauge is maintained constant through adjustment of leak 11 while readings from the ion gauge 15 will serve to indicate the nitrogen or air flow through the system.

Calibration

In order to calibrate the present device it is necessary to do two different things: (1) To discover the correct resistance to add to the line by means of constriction 14, and (2) to determine the constant for the apparatus which is the multiplier for the ion gauge reading to produce the percentage of non-condensed component.

In order to calibrate the apparatus the following procedure is recommended: The apparatus is evacuated so that the ion gauge would indicate a residual vacuum of $10^{-6}$ mm. Hg or better. The Pirani gauge should then be set to read zero. This may be done by the adjustable resistance 44. (See Fig. 3.) The standard sample (say 10% air and the remaining uranium hexafluoride) is then admitted by suitable operation of the valves 3 to 7, inclusive, with valves 1, 2, 4 and 5 closed. The adjustable leak 11 is then regulated so that the Pirani gauge reads 150 microamperes. (See meter 49, Fig. 3.) As a result, the increase in the ion gauge reading is observed; and for a standard sample containing 10% air this increase should be approximately to $3 \times 10^{-5}$ mm. Hg.

The part of the apparatus to the left of the adjustable leak 11, as shown in Fig. 1, is then evacuated by closing valves 3, 6, and 7 and by opening valve 5 permitting the pump 10 to evacuate through KOH trap 9. It is then filled with dry air at a pressure comparable with that of the standard sample used previously although the exact pressure need not be duplicated. This is accomplished by closing valve 5 and opening valve 4 to dry air source 58. The Pirani gauge reading is again made to read 150 microamperes by a suitable adjustment of the capillary leak 11. The ion gauge reading is again noted. It will be found in general that if a 10% air sample gave a reading of $3 \times 10^{-5}$ mm. on the ion gauge, then a 100% air sample will give considerably more than 10 times this reading. The capillary or other constriction is then placed in the line as shown at 14. The effect of this constriction is to change the Pirani gauge reading but not materially change the ion gauge reading. This action tends to increase the Pirani gauge reading. This is due to the fact that the increase in resistance of constriction 14 by adjustment tends to build up the pressure on the Pirani side more than it tends to decrease pressure on the ion gauge side, thus changing the relation between the readings of the Pirani gauge and the ion gauge. This characteristic results from the fact that this is a dynamic as distinguished from a static system and the ion gauge side of the system is being continually evacuated by pumps 17, 19 which tends to limit the effect of the pressure adjustment. The Pirani gauge reading then can be restored to its selected value (in this case 150 microamperes) by closing the adjustable leak 11 which in turn reduces the ion gauge reading. After a few trials regarding the regulation and adjustment of the resistance in the line at the constriction 14, the ion gauge reading can be made to read $3 \times 10^{-4}$ at the selected Pirani gauge reading. Thus at a given Pirani gauge reading (150 microamperes in this case) a 10% air sample gives an ion gauge reading of $3 \times 10^{-5}$ and a 100% air sample $3 \times 10^{-4}$ or 10 times as much. Thus, the apparatus has been made linear. It is realized that but two points were used to calibrate it, but experience has shown that intermediate points are substantially linear. For instance a 50% air-uranium hexafluoride mixture will provide a reading very nearly $1.5 \times 10^{-4}$.

Occasionally adjusting a line constriction will produce a slight effect on the low concentration samples. Thus on again introducing the 10% standard sample it may be noted that the ion gauge reads somewhat less than the $3 \times 10^{-5}$ which it is supposed to read. For example, it may read about 2.8 instead of 3. If this is the case, another 100% air sample may be introduced and the constriction 14 altered slightly so that the ion gauge will read $2.8 \times 10^{-4}$. It may be necessary to continue this process through another stage, but usually not more than two adjustments are necessary.

From the foregoing it is apparent that by maintaining the Pirani reading constant at a predetermined value, the ion gauge, which indicates pressure of nitrogen, air, or other contamination gases may be made linear in its readings by adjustment of constriction 14 to alter the relationship of the Pirani and ion gauge readings.

To measure an unknown mixture it is only necessary to introduce the mixture of the Pirani gauge reading for which the device has been calibrated, to note the ion gauge reading, to correct the ion gauge reading by subtracting the residual pressure, and to multiply the corrected ion gauge reading by the constant for the apparatus.

Ion gauge circuit

Referring to Fig. 2, electrons are emitted from the filament 30 at about 100 or more volts energy. These electrons are accelerated to the grid 31 by a positive potential from source 56 where they are collected and as a result flow through the grid circuit. During their travel from the filament 30 to the grid 31, electrons bombard the gas within the evacuated envelope 54, and the resulting positive ions are collected on the plate 32. It should be pointed out that, unlike an ordinary vacuum tube, the plate is made the most negative element in the tube by source 55 so that it can operate as the ion collecting means. The current flowing in the plate circuit serves as a measure of the pressure and is measured by a vacuum tube voltmeter 33, which may be of conventional type, or of the type disclosed in the copending application of Irving R. Brenholdt, Ser. No. 8,986. Power sources are simply shown in diagrammatic form although the power and control circuits of Brenholdt, supra, are preferred in actual practice.

Pirani gauge

The Pirani gauge, heretofore referred to generally, and diagrammatically shown in Fig. 3, as representing one form of suitable Pirani, comprises a power transformer 40 and rectifier 53 with the usual filter and voltage stabilizing circuit 41, including a voltage regulator tube 42. The Pirani circuit includes a series of resistances 43, 44, 45, 46, 47, and 48 which form the usual Wheatstone bridge. Pirani gauge resistance 48 is exposed to the conditions within the system to be tested, and either serves to balance or unbalance the bridge. The unbalance of the bridge is measured by galvanometer or other meter 49. Current is fed to the bridge at point or juncture 50 from the power supply and leaves the bridge at 51 where it returns to ground. The circuit is completed by grounding the secondary winding of the power transformer at 52. Other forms of Pirani gauges, such as the one set forth in the copending application of MacNeille, Ser. No. 698,333 may be employed in lieu of the one disclosed since applicant's invention is not directed to the details of any particular Pirani gauge.

Miscellaneous

The system heretofore described was actually developed for the purpose of detecting small amounts of inert gas in $UF_6$, although it can be and was used for higher percentages of inert gas at a sacrifice of its accuracy. If the amount of inert impurity is less than about five percent, the reading of the Pirani gauge is determined almost exactly by the UF₆ flow. Thus the flow contriction 11 can be adjusted to show a certain Pirani gauge reading. This is then a relatively accurate measure of the total gas flow. The ionization gauge reads the inert gas pressure, and the reading is very nearly proportional to the percentage of inert gas present. While ionization gauges give different responses for different inert gases, in practice most gases used, that is, air, nitrogen and oxygen, give substantially the same responses.

Consider an example: Assume the unknown gas to consist of 2% air and 98% UF₆. The gas flow as determined by the Pirani gauge reading may thus be in error by approximately 2%. Hence, if the device is used with a fixed Pirani gauge reading the ionization gauge may not tell the amount of air more accurately than 2 percent of 2 percent, that is, to 0.04%. This is completely acceptable accuracy for many purposes.

I claim:

1. A system for measuring small quantities of contamination in a gaseous mixture comprising means for introducing a flow of the mixture from a high pressure area to a low pressure area, means for regulating the flow of the mixture to the low pressure area to maintain a predetermined pressure therein, means for removing the desired components from the mixture, an ion gauge for measuring the contamination gases as a function of pressure, and a constriction adjustable to a fixed position for providing a large pressure differential between the low pressure area and the location of the ion gauge.

2. A system for measuring small amounts of contamination in a gaseous mixture comprising means for feeding the mixture from a high pressure area to a low pressure area, pressure indicating means communicating with the low pressure area, said indicating means comprising a hot wire gauge, means for controlling the flow of mixture from the high pressure area to the low pressure area to maintain a fixed reading of said indicating means, a trap for removing the desired components from the mixture, an ion gauge positioned beyond the trap for measuring the contamination gases of the mixture as a function of pressure, and a constriction interposed between the low pressure area and the zone of the ion gauge to limit the flow of contamination gases for setting up a large pressure differential between said area and said zone.

3. A system for measuring small amounts of contamination in a gaseous mixture comprising means for introducing a flow of mixture from a high pressure area to a low pressure area, indicating means responsive to pressure in the low pressure area, said indicating means comprising a resistance gauge, an adjustable constriction for controlling the flow of mixture to the low pressure area to maintain the reading of said indicating means at predetermined fixed magnitude, means for removing the desired components from the mixture, an ion gauge for measuring the contamination gases of the mixture as a function of pressure, and a second constriction interposed between the low pressure area and the zone of the ion gauge and adjustable to a fixed position to limit the flow of contamination gases and provide a large pressure differential.

4. A system for measuring small amounts of contamination in a gaseous mixture comprising means for introducing a flow of mixture from a high pressure area to a low pressure area, a constriction for controlling the flow of the mixture into the low pressure area to maintain a predetermined pressure level therein, a hot wire gauge responsive to pressure in the low pressure area, means for reacting the desired components of the mixture for securing partial removal, additional means for solidifying the residual components remaining in the mixture, an ion gauge for measuring the contamination gases as a function of pressure, and a second constriction interposed between the low pressure area and the ion gauge for producing a large pressure differential.

ALFRED O. C. NIER.

REFERENCES CITED

The following references are of record in the file of this patent:

UNITED STATES PATENTS

| Number | Name | Date |
|---|---|---|
| 2,370,703 | Zaikowsky | Mar. 6, 1945 |
| 2,389,706 | Williams et al. | Nov. 27, 1945 |
| 2,393,650 | Metcalf | Jan. 29, 1946 |

OTHER REFERENCES

Dennis: Gas Analyses, pp. 40 and 41 (1920). The Macmillan Co., N. Y.

Daynes: Gas Analyses by Measurement of Thermal Conductivity, pp. 186 and 187 (1933). Published by Cambridge University Press, London, England.